Figure 11:
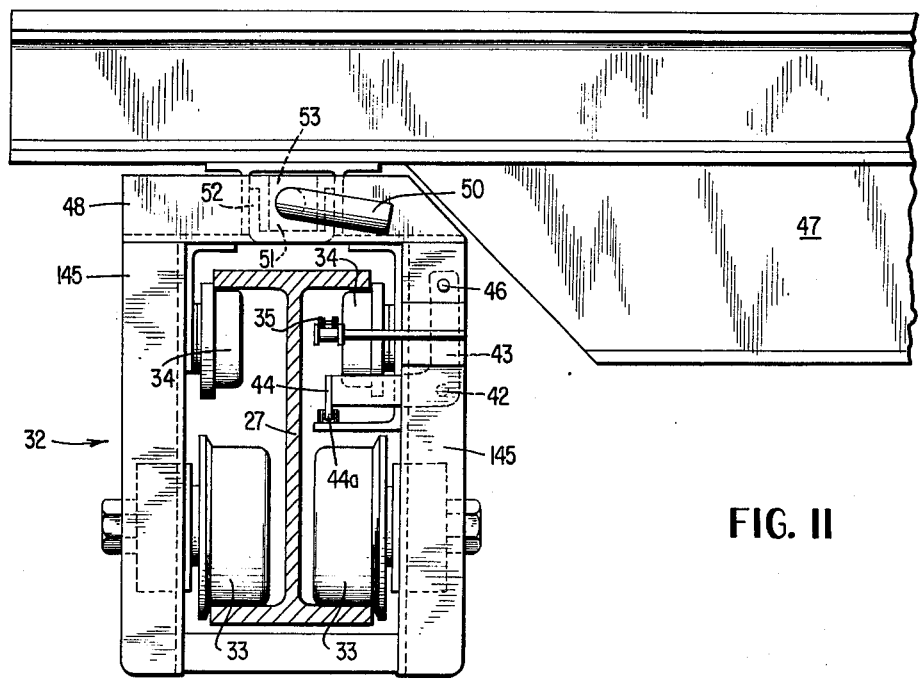

Feb. 4, 1964 L. R. LUCHFORD 3,120,316
LOADING AIDS
Filed Sept. 24, 1959 8 Sheets-Sheet 1

FIG 1

INVENTOR
LAURENCE R. LUCHFORD

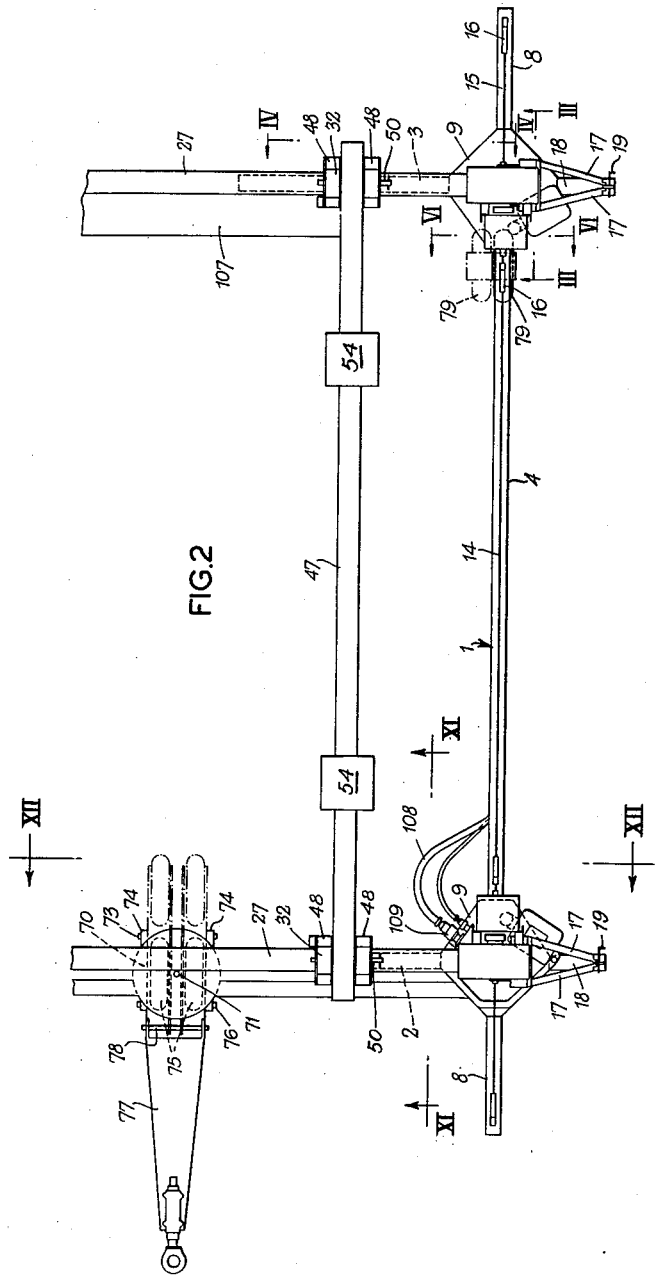

Feb. 4, 1964  L. R. LUCHFORD  3,120,316
LOADING AIDS
Filed Sept. 24, 1959  8 Sheets-Sheet 3
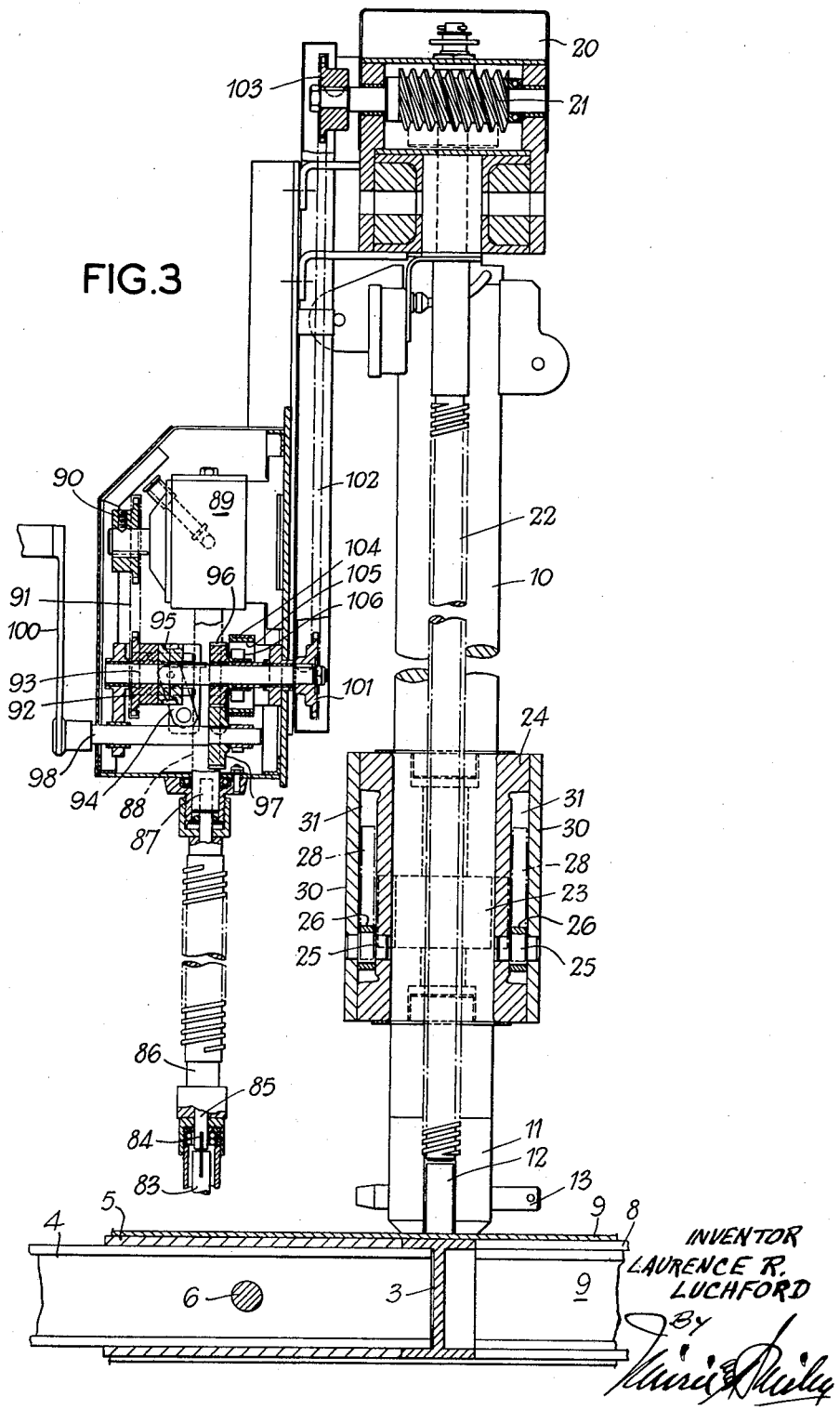

Feb. 4, 1964　　　L. R. LUCHFORD　　　3,120,316
LOADING AIDS
Filed Sept. 24, 1959　　　　　　　　　　　　8 Sheets-Sheet 4
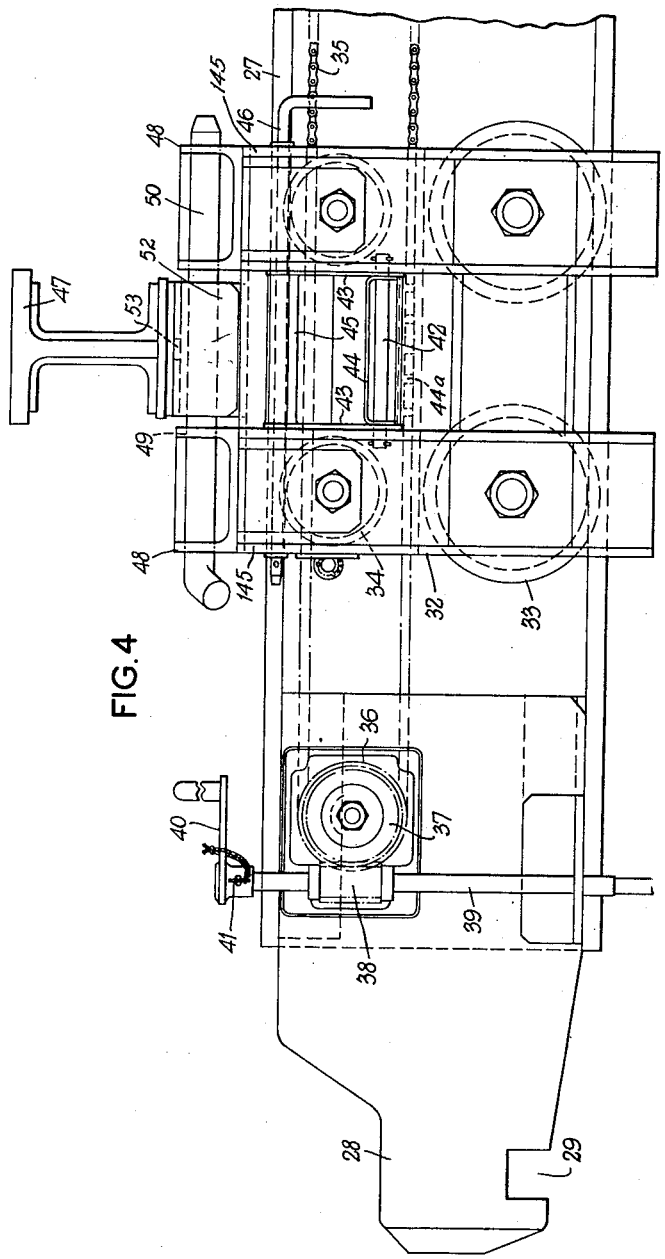
INVENTOR
LAURENCE R. LUCHFORD
BY

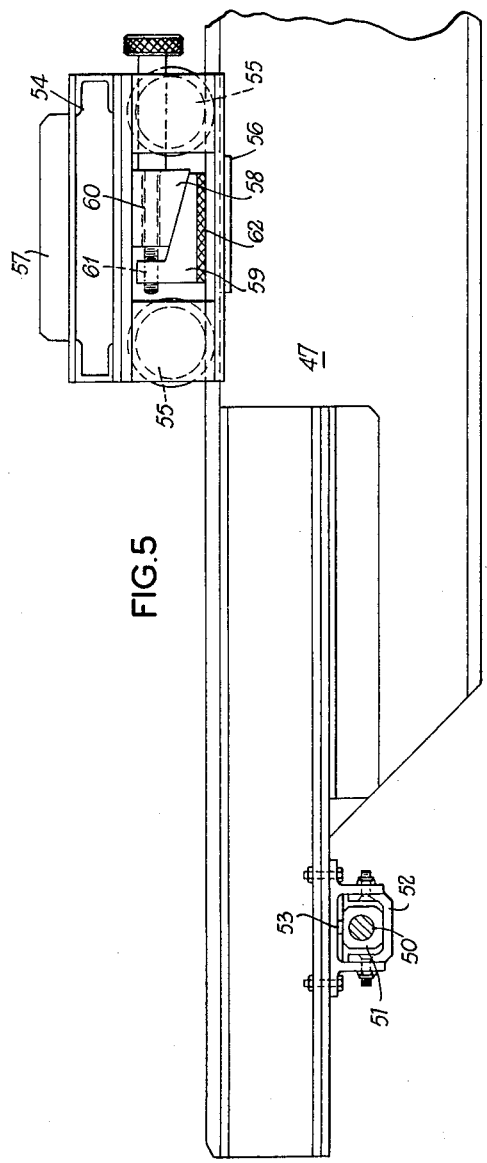

Feb. 4, 1964  L. R. LUCHFORD  3,120,316
LOADING AIDS
Filed Sept. 24, 1959  8 Sheets-Sheet 6
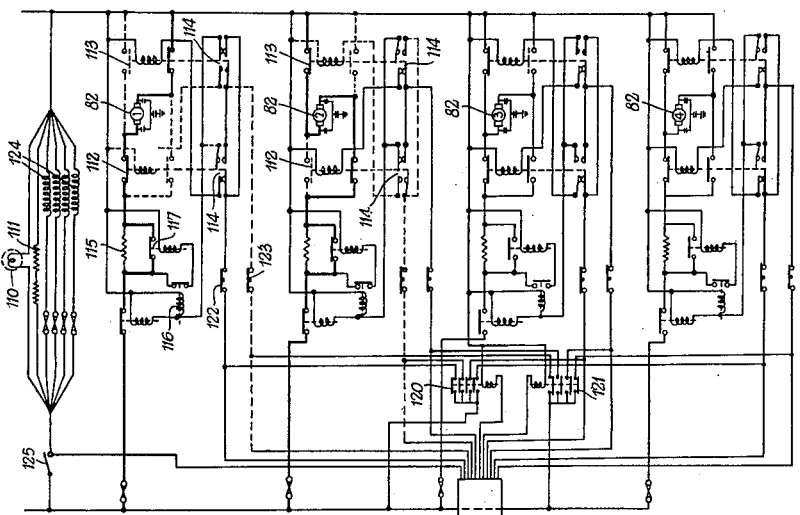
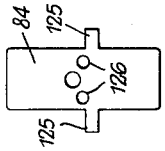
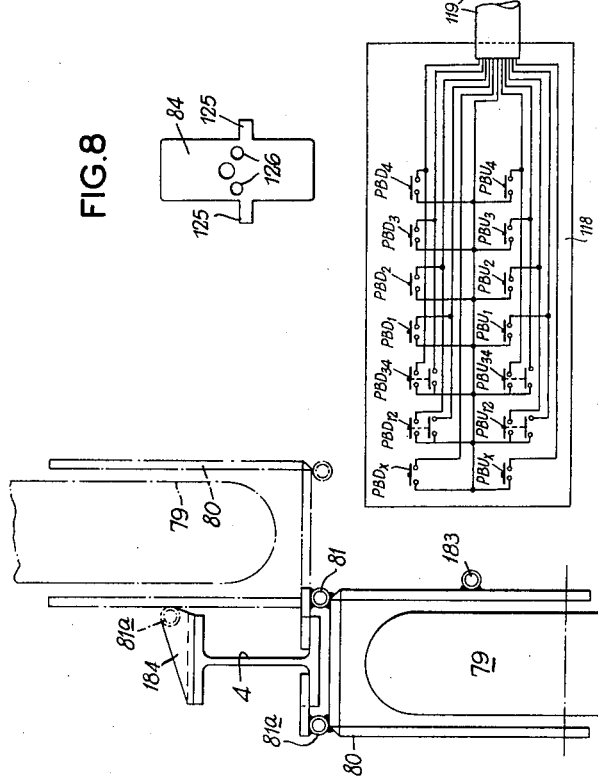
INVENTOR
LAURENCE R. LUCHFORD
BY

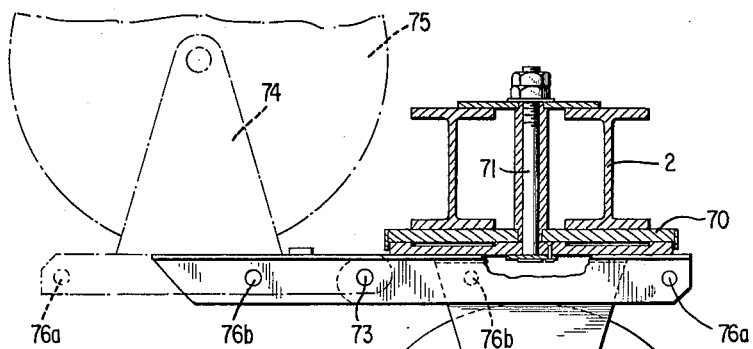
FIG. 9
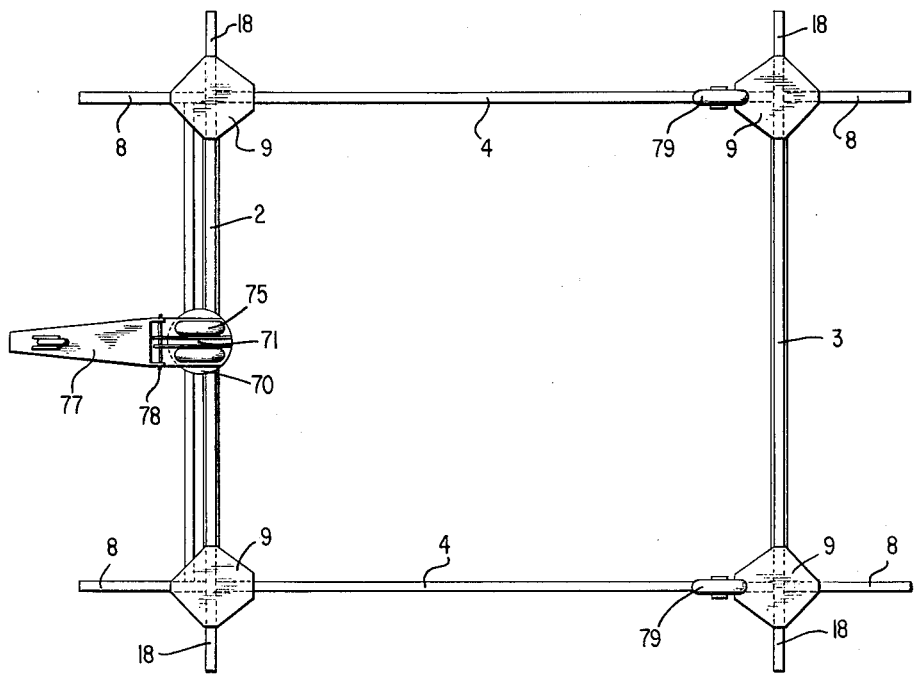
FIG. 10

Feb. 4, 1964     L. R. LUCHFORD     3,120,316
LOADING AIDS

Filed Sept. 24, 1959     8 Sheets-Sheet 8

INVENTOR
LAURENCE RICHARD LUCHFORD

BY

ATTORNEYS.

3,120,316
LOADING AIDS
Laurence Richard Luchford, East Molesey, England, assignor to Trianco Limited, East Molesey, England
Filed Sept. 24, 1959, Ser. No. 842,020
Claims priority, application Great Britain Sept. 25, 1958
10 Claims. (Cl. 214—394)

This invention relates to loading aids for use in loading or unloading goods, especially though not essentially for use in transferring heavy loads between a road vehicle and aircraft. For convenience, the invention will be described in this specification in relation to its use in connection with the loading and unloading of aircraft but it will be understood that it is not restricted to such use.

An object of the present invention is to provide a loading aid for the transfer of a load between a vehicle and an aircraft which can be accurately positioned both horizontally and vertically with the vehicle or the aircraft and can be accurately adjusted to align the load as it is moved into or out of the aircraft or vehicle.

Another object of the invention is to provide for the lowering or raising of the load in accordance with the change in level of the aircraft or vehicle as the load is taken on or off the aircraft or vehicle.

Another object of the invention is to provide for the remote control of a loading aid by one operator, free to move about the loading aid so that misalignment of the load during adjustment can be avoided.

Yet another object of the invention is to provide a loading aid which can be quickly disassembled without the use of tools and stowed compactly for transport and which can be quickly reassembled when required.

Yet another object of the invention is to provide a power operated loading aid which can be converted for manual operation when required, such conversion being achieved without risk of accidental lowering of the load at any of the lifting points.

From one aspect, the invention provides a loading aid having a pair of longitudinal beams to receive a load, these beams being supported on transverse beams along which they are movable parallel to one another to align them in accurate position relative to an aircraft sill or vehicle platform. Each end of the longitudinal beam is movable to a limited extent along the transverse beam independently of the other end so that the beam can be slewed to adjust for lack of parallelism of the aid with the aircraft sill or vehicle platform. The ends of the longitudinal beams are supported on saddles movable along the transverse beams by chain and sprocket gearing.

From another aspect, a loading aid in accordance with the invention comprises a base frame, transverse beams movable vertically relative to the base frame, longitudinal load bearing beams supported from these transverse beams and movable transversely and prop members mounted beneath these longitudinal beams adapted to contact the ground and raise the loading aid respectively to the ground when the longitudinal members are lowered relatively to the base frame. This facilitates the manoeuvring of the aid in relation to the aircraft or vehicle. With the aid in approximately the desired position, the transverse beams may be lowered, lowering the longitudinal beams and transferring the weight of the aid to the props. The transverse beams and the frame may then be moved transversely relatively to the longitudinal beams until the base frame is accurately positioned, the base frame lowered to raise the aid off the props and the longitudinal beams moved transversely to position them accurately relative to the base frame. The props may be retractable relative to the longitudinal beams for stowing purposes. Wheels may be provided on which the aid may be supported for transportation or for manoeuvring roughly into position. These wheels may be retractable or dismountable and brought into operative position whilst the aid is supported on the props or may be mounted directly on and form part of the props.

From yet another aspect, a loading aid in accordance with the invention comprises a base frame having longitudinal and transverse members connected by with-drawable pins, a vertical stanchions at the corners of the base frame and connected thereto by with-drawable pins, saddle blocks movable vertically on the stanchions, transverse beams mounted on trunnions on these saddle blocks and readily detachable therefrom, transverse saddles movable along these transverse beams and longitudinal beams connected to these saddles by with-drawable pins forming trunnions, the arrangement being such that the aid may be disassembled by with-drawal of the readily detachable pins.

From yet another aspect, the invention provides a loading aid having a pair of transverse beams supporting longitudinal load carrying beams and each supported on trunnions on saddle blocks movable vertically on stanchions at each end to raise or lower a load, each end of each transverse beam being individually movable whereby the aid can be accurately adjusted vertically and aligned with an aircraft sill or vehicle platform.

From still another aspect, the invention provides a loading aid in which each corner of a loading supporting member can be raised or lowered individually or in combination by electric motors controlled from a switch box connected to the loading aid by a flexible cable, and adapted to be carried by an operator.

Figure 12:
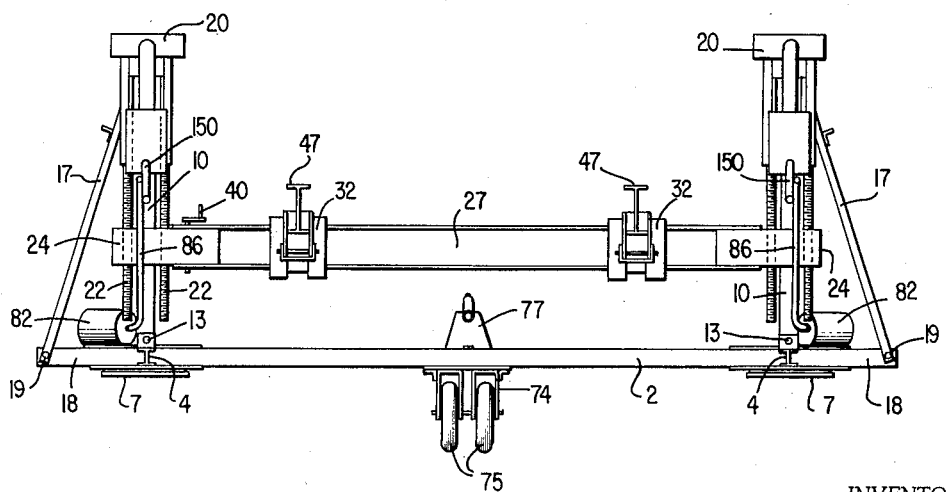

Other parts of the invention are embodied in the preferred form which will now be described in some detail by way of example with reference to the accompanying drawings in which:

FIG. 1 is a side view of the machine,
FIG. 2 is a plan view of one side of the machine, the other side which is similar being omitted,
FIG. 3 is a view on the line III—III of FIG. 2 showing in elevation a stanchion and the parts associated therewith,
FIG. 4 is a view on the line IV—IV of FIG. 2 showing one end of a transverse beam, the other end being similar,
FIG. 5 is a view on the line V—V of FIG. 2 showing one end of a longitudinal beam and its associated trolley,
FIG. 6 is a view on the line VI—VI of FIG. 2 showing a detail of the wheel mounting,
FIG. 7 is a wiring diagram,
FIG. 8 is a view of a detail,
FIG. 9 is an enlarged view of the connection between the front wheels and the frame,
FIG. 10 is a bottom view of the frame illustrating the location of all the wheel supports,
FIG. 11 is a sectional view on the line XI—XI of FIG. 2, and
FIG. 12 is an elevational view as viewed on line XII—XII of FIG. 2.

In this form a rectangular base frame 1 comprises a front transverse member 2, a rear transverse member 3 and two side beams 4 connected together to form a rectangle. The ends of the side members 4 engage in sockets 5 projecting from the transverse members and are secured by pull-out pins 6 so that they can be readily detached.

The transverse members 2, 3 are supported on load-bearing pads 7 arranged at the corners of the rectangle formed by the transverse members and the side beams. Short beams 8 project at right angles to the transverse members in alignment with the side beams 4 and the corners of the rectangular frame are strengthened by horizontal plates 9.

At each corner of the rectangular frame is a vertical stanchion 10 of tubular section. This stanchion has a forked end 11, which fits over a short boss 12 at the corner of the frame and is fixed thereto by a withdrawable pin 13 which also serves as a trunnion about which the stanchion 10 can pivot to a small extent in a vertical plane through the transverse members 2, 3.

Stay wires 14, 15 connect the top of the stanchion to points on the longitudinal side members 4 of the frame, one wire 14 being connected to the top of the plate 9 and the other 15 to the short projecting beam 8. These stay wires include quick acting releases 16 such as an over-centre toggle release so that they may be free from the side members for dismantling of the stanchion to which they remain attached. Rigid stay members 17 are provided between the top of the stanchion and an extension 18 of the transverse members 2, 3 of the base frame and this stay may be quickly disconnected at one or both ends for dismantling purposes by withdrawal of a pin 19.

At the top of this stanchion is a cross head 20 housing a worm and wheel drive 21 to two screw-jack threads 22 having their axes parallel to the axis of the stanchion 10. These threads are of opposite hands and engage in self-aligning nuts 23 located in a saddle 24 mounted coaxially on the stanchion. This saddle 24 moves up or down the stanchion on rotation of the screw jacks.

Mounted in the saddle are two co-axial trunnion pins 25 with their axes parallel to the longitudinal side members of the frame. These pins 25 carry trunnion blocks 26, one on each side of the stanchion 10. Plates 30 are bolted to the saddle enclosing the blocks 26 and defining deep slots 31 with the side of the saddles.

Between the stanchions at the front and at the rear of the frame are a pair of transverse load-carrying beams 27 supported at their ends by the trunnion blocks 26 on the saddles 24. Extension plates 28 at each end of the beam are provided and notches 29 in these plates engage over the trunnion blocks 26. The trunnion blocks are square and the notches are larger than the blocks so as to provide endwise clearance. This enables one end of the transverse beam 27 to be raised relatively to the other to tilt the beam.

The transverse beams are retained on the saddle blocks by the plates 30. They may be raised in the slots 31 clear of the trunnion blocks when it is desired to remove the transverse beams 27 from the stanchions. Latches may be provided to retain the plates 28 in the slots 31 and manually lifted when it is desired to remove the beam.

Mounted on each of the two transverse beams 27 are two saddles 32. A pair of flanged wheels 33 on each side of the saddle run on the top faces of the lower flange of the beam 27 which is of I section and another pair of flanged wheels 34, run on each side of the saddle on the under-side of the top flanges.

An endless chain 35 runs along between the top and bottom flanges of the beam and passes around sprockets 36 near the ends of the beam. One of these sprockets is coaxial with a worm wheel 37 which engages with a worm 38 on a vertical shaft 39 rotatable manually by a handle 40. This handle can be applied to either the top or bottom end of the shaft 39 and is secured thereto by a withdrawal pin 41.

To each saddle is pivoted about a pin 42 a pair of bell-crank levers 43 having fixed at the end of one arm a bar 44 carrying a plurality of dog-teeth 44a which can be engaged in the links of the chain 35 or disengaged therefrom (thus forming a clutch) by movement of the bell-crank lever 43 about its pivot 42 the other arms being connected by a handle 45 for this purpose. The clutch is retained in the engaged position by a withdrawable pin 46 passing through side flanges 145 on the saddle and through the handle 45 of the bell-crank levers 43. With the clutches of both saddles engaged, the saddles can be moved together along the beam by manual rotation of the worm shaft 39. With either clutch disengaged, the saddles can be moved relatively to one another by the chain or manually and positioned as desired along the transverse beam. With both clutches disengaged, the saddles can be moved manually.

The transverse saddles 32 on the two transverse beams 27 support two longitudinal load-carrying beams 47. On the top face of the saddles 32 are mounted a pair of channels 48 with their flanges vertical. Through aligned holes 49 in these flanges passes a withdrawable pin 50 having its axis parallel to the length of the transverse beam 27. A trunnion block 51 mounted on the underside of the longitudinal beam is engaged between the two channels 48 and the withdrawable pin 50 passes through this trunnion block forming a trunnion about which the longitudinal beam may pivot in a vertical plane relatively to the transverse beam. On withdrawing this pin the longitudinal beam can be lifted clear of the transverse beam for dismantling purposes.

The trunnion block 51 is housed in a box 52 fixed to the longitudinal beam 47 and is rotatable about a vertical pin 53 in the longitudinal beam. This enables the longitudinal beam 47 to be slewed to a small extent to either side so as to be at an angle up to about 4° less than a right angle to the transverse beam 27.

It will be appreciated that this combination of pivotal joints permits movement of the longitudinal load carrying beams from side to side in parallelism to one another by operation of the chain drive to the transverse saddles 32 or they may be moved at one end only to become inclined to the centre line of the aid whilst remaining parallel to each other. Such movement is possible with or without a load on the beams so that they can be aligned as desired with for example the sill of an aircraft or the platform of a vehicle.

The load is supported from the longitudianl beams 47 by trolleys 54 each of which has a pair of flanged rollers 55 running on the top face of the beam 47. The rollers 55 are mounted in ball bearings and the trolleys are retained on the beam by inwardly directed flanges 56 engaging beneath the flange of the beam. A vertical flange 57 along one side of the trolley is provided to serve as a guide to a platform when this (carrying the actual load) is placed on the trolleys.

Means are provided for locking the trolleys at any position along the beams. Such means may comprise a manually operated friction brake between the top face of the beam and the underside of the trolley. For example, a pair of wedges 58, 59, positioned between the two rollers 55, may be movable over one another by a screw 60 and threaded hole 61, the face of the wedge in contact with the beam being covered with friction material 62.

Each longitudinal beam 47 carries on its underside a pair of props 63 each mounted in a bracket 64 so that it can be swung about a pivot pin 124 from a position in which it is stowed beneath the beam to a position in which it projects at right angles. The props are locked in each position by a withdrawal pin 65 inserted through a hole 66 in the bracket and the appropriate one or two holes 67, 68 in a plate 69 fixed to the strut.

The base frame is provided with wheels on which it can be supported for transport by towing. Centrally of the front transverse beam is mounted a turntable 70 rotatable about a vertical pivot 71. Hinged to this turntable about a pin 73 is a pair of brackets 74 between which is mounted a twin wheel 75. The brackets 74 can be moved from the position shown in full lines in FIG. 1 with the wheel 75 lowered to the position shown in dotted lines where the wheel is stowed within the base frame. The bracket 74 is fixed in the lowered position by a pin 76 passing through aligned holes 76a in the bracket and the turntable 70 and in the upper position by a pin passing through additional holes 76b. A tow bar 77 is secured to the turntable 70 by a removable pin 78.

At the rear of the machine, there is provided a pair of rear wheels 79, each being mounted on the longitudinal side member 4 of the base frame. Each wheel is mounted in a bracket 80 hinged about a pin 81 mounted on the inner flange of the beam 4. The bracket can be moved about this pin 81 to the full line position shown in FIGS. 1 and 2 and retained by a withdrawable pin 81a passing through aligned holes on the bracket and the outer edge of the beam 4. It can also be moved to the position shown in dotted lines in which it is stowed inside the frame and retained in this position by passing the pin 81a through holes in bosses 183, 184 formed on the side of the bracket 80 and the top flange of beam 4 respectively.

The screw jacks 22 by which the transverse beams 27 are raised or lowered on the stanchions 10 are power operated by individual electric motors 82 mounted at the foot of each stanchion, provision being made to disconnect this power drive and to engage a manually operable drive for use when electric power is not available.

Each motor 82 drives through one-to-one ratio right-angled spiral bevel gears, a vertical output shaft 83. This is connected through a shear strip 84 to a detachable flexible drive shaft 85 which is connected at its other end through a coupling 87 to the input shaft 88 of a gear-reduction box 89. This permits the use of a high speed flexible drive shaft at a relatively low driving torque as is necessary since the drive shaft must be reversible. The shear strip 84 is designed to shear when more than a predetermined torque is applied to it so as to protect the driving gear against excessive overloads. It comprises projecting fins 125 which rest on the top of the output shaft and is weakened above these fins by holes 126 so that when it shears, the finned portion protrudes from the out-put shaft. The shear strip is easily accessible on disconnection of the flexible hose 86 used to enclose the flexible shaft and can easily be lifted when sheared by the finned part protruding from the vertical output shaft 83.

The gear reduction box 89 drives through sprocket 90, and chain 91 a sprocket 92 loose on a countershaft 93 on which is slidably arranged a two-way dog clutch 95 controlled by a hand operated gear change lever 94. In one position the clutch 95 engages sprocket 92 and connects the countershaft 93 to the input shaft 88 of the power drive and in the other connects its through engaging pinions 96, 97 with a parallel shaft 98 having a square end to which a handle 100 may be affixed for manual operation.

The countershaft 93 is connected to the worm and wheel drive of the two jackscrews through sprocket 101, chain 102 and sprocket 103. To prevent accidental lowering of the saddles by reverse drive by the load when for example the clutch is being moved from manual to power operation or vice versa, a friction brake band 104 is provided around a pulley 105 mounted on the countershaft 93 through a free wheel device 106. The brake band is fixed at its ends to the side of the casing housing the gears and countershaft and is adjustable by means of a screw-thread and nut. The free-wheel device 106 is arranged so that the countershaft 93 is free of the pulley 105 when rotated to raise the load so that the friction brake 104 offers no extra loading. When the load is lowered however the brake 104 is effective and holds the load against accidental movement. It also reduces the over-run of the load when power is switched off after a lowering operation.

The motors are shunt-wound to provide a relatively constant speed load characteristic. They are reversed by reversing the armature current.

Control of the motors 82 is effected by switches and relays housed in a switch box 107 which is attached to the transverse member 3 of the base frame. Multi-core cables 108 are led from this box to each of the four motors and are connected thereto by watertight detachable plug and socket connections 109. When the aid is dismantled, these cables are coiled up and stowed on the transverse member 3 carrying the switch box 107. Covers are provided for the ends of the cables and for the sockets at the motors for use when the cables are disconnected.

Power is supplied to the switch box 107 by a plug and socket connection to a flexible cable connected to a source of direct current.

The control circuits are shown in FIG. 7. The motors at the front are numbered No. 3 and No. 4. In FIG. 7, the switches are shown in position such that motor No. 1 is driving up and motor No. 2 is driving down whilst motors No. 3 and No. 4 are not running.

The shunt fields 124 of all the motors are permanently energised when a field switch 125 is made and a warning light 110 is simultaneously energised. A resistance 111 is connected across the fields 124 to take the surge of current when the fields are broken and to protect the warning light 110.

Selection of the direction of rotation of each motor (Up or Down) is effected by a pair of selector switches 112, 113 which change over the armature connections according to which is made. Each switch 112, 113 carries additional contacts 114 which are included in the operating circuit of the other switch 113, 112 so that if either switch is made, the other switch cannot be energized. The switches are thus interlocked so that reverse current cannot be applied before the switch gear has opened from its first selected direction.

A starting resistance 115 is in series with the armature and is cut out by a time delay relay 116 operating a short circuiting switch 117 after about a half second delay. This prevents excessive snatch when the motor starts to drive and avoids undue strain on all driving members.

Operation of the selector switches to start the motors in either direction is effected by operation of push buttons which are housed in remote control box 118 connected to the switch box 107 by a flexible cable 119. This remote control box, supported by a collar strap and waist band, is worn by the operator who can move freely to any position of advantage to supervise and operate personally all necessary raising or lowering operations. When not in use, the remote control box 118 is stowed on top of the switch box 107, the connecting cable 119 is coiled up on top and the waist band is used to strap the box and cable in position.

The remote control box contains fourteen push buttons, each of which is enclosed in watertight bellows. There is an Up button $PBU_1$, $PBU_2$, $PBU_3$, $PBU_4$ and a Down button $PBD_1$, $PBD_2$, $PBD_3$, $PBD_4$ for each motor so that each motor can be operated individually to raise or lower its corner independently. There are four two-contact push buttons, $PBU_{12}$, $PBD_{12}$ arranged to operate the front two motors Up or Down together and $PBU_{34}$, $PBD_{34}$ to operate the rear two motors Up or Down together. There are also Up and Down buttons $PBU_X$ and $PBD_X$ which operate four-way relays 120, 121 which control all the motors simultaneously so that all four corners can be raised or lowered together.

Limit switches 122, 123 are provided at the top and bottom of the stanchions and are operated by the transverse beam to trip the motor circuits when the beam is fully raised or lowered.

The operation of the loading aid is as follows; starting from a position in which it is supported from the ground on the pads 7. The longitudinal beams 47 are raised to allow the props 63 to be lowered and fixed in position. The longitudinal beams are then lowered until the props contact the ground and the motors then run in the same lowering direction thereby lifting the stanchions and base frame relatively to the ground. The wheels 75, 79 are swung into their lowered position and locked therein and the motors run in the reverse direction thus lowering the base frame until the wheels contact the ground and take the weight. Thereafter the longitudinal beams 47 rise to lift the prop 63 clear of the ground when they can be swung about their pivots into stowed position.

The aid is then towed to the aircraft and manoeuvred on the wheels into reasonably close alignment with the loading bay. If as is likely, the alignment is not as accurate as desired, the longitudinal beams are lowered to support the aid on the props 63. The handles 40 moving the saddles 32 relatively to the transverse beams 27 are operated, thereby moving beams 27 and so the base frame to right or left as required. The base frame is then lowered to the ground by operating the four motors 82 in the Up direction and this movement is continued to raise the props 63 clear of the ground. The props are then stowed and the longitudinal beams 47 moved across the transverse beams 27 by the handles 40 to adjust their position relatively to the loading bay.

The goods to be loaded are mounted on a platform which is carried by a road vehicle and this vehicle is next manoeuvred into position in alignment with the loading aid, that is with the longitudinal beams 47 parallel with the edges of the platform. Any minor misalignment is corrected by moving the longitudinal beams either at one or both ends.

A load-bearing trolley 54 is slipped on to each beam 47 and the platform with its load is then winched forward off the vehicle until its front end is over the trolleys 54. The beams 47 are then raised until the trolleys 54 take part of the weight of the load and the platform is again winched forward. As the load is transferred to the loading aid the vehicle will tend to rise and the operator raises the loading aid at that end (or both ends) by remote control operation of the motors 82. The operator is free to move around as necessary and can constantly adjust the height of each end of the longitudinal beams 47 so as to ensure that the load is transferred evenly and without twisting or racking.

When the platform is nearly completely on the loading aid, the ends of the longitudinal beams at the vehicle end are lowered and the other trolleys 54 slipped on to the beams. These ends of the beams are then raised so that the trolleys take the load entirely, when the vehicle can be driven away.

The same process is continued as the load is transferred from the loading aid to the aircraft. Any misalignment is corrected by shifting the longitudinal beams to one side or the other or by slewing them, the beams of course remaining parallel to one another at their original distance apart. Any variation in height is corrected by the operator from the remote control box. When the load has been completely transferred to the aircraft, the aid can be lowered on its castor wheel and towed away.

The loading aid may be used to transfer stores on pallets or similar loads. For this purpose adaptors are provided to be latched on top of the longitudinal beams and to accommodate standard roller conveyor sections or an endless conveyor.

To dismantle the loading air, the pins 50 forming trunnion between the longitudinal beams 47 and the saddles 32 are withdrawn and the longitudinal beams lifted off. The props 63 may be removed by withdrawing the hinge pins 124 or may be kept in their stowed position. The transverse beams 27 are lowered on to stools (which may be pivoted to the transverse members of the base frame and raised into position when required), and the saddles 24 further lowered to free them from the transverse beams. The latches securing the beams are raised manually to release them. The transverse stays 17 of the stanchions 10 are released and the stanchions 10 tilted outwardly about the pivot pins 13 at their lower ends. This clears the stanchions 10 from the end plates of the transverse beams 27 and these latter can be lifted away.

The flexible drive 85 from the motor 82 to the gear box at each stanchion is disconnected and the stay wires 14, 15 releases by operation of their quick release catches 16. The pivot pins 13 are then withdrawn and the stanchions (with the saddles, gear boxes, jack screws and staywires) lifted from their sockets.

The cables to the electric motors remote from the switch box are unplugged, coiled up and stowed at the ends of the front transverse member, being strapped in position and having their ends covered by waterproof caps. Similarly the sockets at the motors and the connectors for the flexible drives are covered with waterproof caps.

The pins 6 connecting the longitudinal side beams 4 and the transverse beams 2, 3 of the base frame are withdrawn reducing the base frame to four units.

It will be noted that the aid may be dismantled into a number of units, each light enough to be man handled and each of compact shape suitable for stowing for transport, without the use of any tools and very quickly.

It will be understood that the invention is not restricted to the details of the preferred form described which may be modified without departure from the broad ideas underlying them.

I claim:

1. A loading aid for transferring a load to and from a platform comprising a base frame, vertical stanchions supported by said base frame near its corners, transverse beams supported at their ends by said stanchions, means for raising and lowering said transverse beams on said stanchions operable to raise and lower each end of each transverse beam independently of the others, longitudinal load bearing beams supported from said transverse beams, means for moving said longitudinal beams together along said transverse beams and for moving each end of each of said longitudinal beams to a limited extent along the transverse beam on which it is supported independently of movement of the other end of said longitudinal beam and independently of movement of the other longitudinal beam whereby said longitudinal beams can be slewed relatively to the base frame to adjust for lack of parallelism of the base frame with the platform.

2. A loading aid as claimed in claim 1, comprising wheels supporting said base frame and a plurality of prop members pivotally mounted at one end on said longitudinal beams, said prop members being lowerable to position their other ends nearly in contact with the ground, whereby subsequent lowering of the longitudinal beams relatively to the base frame raises the base frame relatively to the ground.

3. A loading aid for transferring a load to and from a platform comprising a wheeled, rectangular base frame, four vertical stanchions supported by said base frame near its corners, a saddle block movable vertically on each of said stanchions, a trunnion carried by each of said saddle blocks, a pair of transverse beams each supported by a pair of said trunnions, means for moving each saddle block on its stanchion independently of the other saddle blocks whereby the end of each transverse beam is individually adjustable vertically for alignment with the platform, a plurality of saddles movable along said transverse beams, trunnions carried by said saddles, a pair of longitudinally disposed beams each supported near its ends by a pair of said trunnions, and means for moving each of said saddles on its transverse beam independently of the other saddles whereby each end of each transverse beam is individually adjustable horizontally for alignment with the platform.

4. A loading aid as claimed in claim 3, comprising chain and sprocket gearing on said transverse beams, clutch means for connecting each of said saddles to said chain, said clutch means being independently operable whereby each end of each longitudinally disposed beam may be moved separately along the transverse beams.

5. A loading aid as claimed in claim 3, comprising screw jacks threaded through said saddle blocks on said stanchions, an independently operable motor at each stanchion, a manually operable crank and gearing connecting the motor and crank at each stanchion to the screw jack at that stanchion, said gearing including a two-way clutch operable alternately to connect the screw jack to the motor or to the crank.

6. A loading aid as claimed in claim 3 comprising screw jacks threaded through said saddle blocks on said stanchions, an independently operable motor at each stanchion, and gearing connecting the motor at each stanchion to the screw jack at that stanchion, said gearing including a friction brake and free wheel pulley to prevent lowering of the saddle blocks under the weight of the load.

7. A loading aid as claimed in claim 3 comprising screw jacks threaded through said saddle blocks on said stanchions, an independently operable motor at each stanchion, and gearing connecting the motor at each stanchion to the screw jack at that stanchion, said gearing including a shear strip designed to shear above a portion thereof projecting from the motor drive whereby removal of a sheared strip is facilitated.

8. A loading aid according to claim 3 including an independently operable electric motor at each stanchion to the screw jack at that stanchion, control means operable to operate said motors separately, in selected pairs or all together, said control means being mounted in a switch box connected to said loading aid by a flexible cable and adapted to be carried by an operator.

9. A loading aid according to claim 8 in which the controls for each motor are interlocked to prevent starting of the motor in either direction except from rest.

10. A loading aid according to claim 3 in which said base frame comprises longitudinal and transverse members connected by withdrawable pins, said stanchions are connected to the base frame by withdrawable pins, said transverse load bearing beams are readily removable from said trunnions and said longitudinal load-bearing beams are connected to their said saddles by withdrawable pins whereby the loading aid may be disassembled into a plurality of parts each individually transportable.

References Cited in the file of this patent

UNITED STATES PATENTS

| | | |
|---|---|---|
| 1,342,982 | Boehck | June 8, 1920 |
| 1,740,117 | Pinckney | Dec. 17, 1929 |
| 1,919,823 | Bowling | July 25, 1933 |
| 1,990,539 | Fildes | Feb. 12, 1935 |
| 1,993,245 | Meron | Mar. 5, 1935 |
| 2,424,899 | Priester | July 29, 1947 |
| 2,510,610 | Twist | June 6, 1950 |
| 2,545,953 | Hall | Mar. 20, 1951 |
| 2,565,820 | Machanic | Aug. 28, 1951 |
| 2,655,223 | Villars | Oct. 13, 1953 |
| 2,772,004 | Noble | Nov. 27, 1956 |
| 2,800,200 | Wallace | July 23, 1957 |
| 2,824,623 | Nord | Feb. 25, 1958 |
| 2,843,223 | Villars | July 15, 1958 |

FOREIGN PATENTS

| | | |
|---|---|---|
| 534,578 | Australia | Sept. 10, 1938 |